United States Patent
Lai et al.

(10) Patent No.: US 8,730,661 B2
(45) Date of Patent: May 20, 2014

(54) FASTENING MODULE

(75) Inventors: Wei-Chih Lai, Taipei (TW); Hsin-Hung Hsiao, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 13/463,829

(22) Filed: May 4, 2012

(65) Prior Publication Data

US 2012/0292268 A1 Nov. 22, 2012

(30) Foreign Application Priority Data

May 16, 2011 (TW) .............................. 100117101 A

(51) Int. Cl.
*H05K 7/00* (2006.01)

(52) U.S. Cl.
USPC ........................................ 361/679.33; 211/26

(58) Field of Classification Search
USPC ..................... 211/26, 26.2, 41.12; 361/679.33–679.39
See application file for complete search history.

(56) References Cited

U.S. PATENT DOCUMENTS

| | | | | |
|---|---|---|---|---|
| 6,166,901 A * | 12/2000 | Gamble et al. | ........... | 361/679.34 |
| 6,206,187 B1 * | 3/2001 | Van Winkle | ................... | 206/320 |
| 6,249,432 B1 * | 6/2001 | Gamble et al. | ........... | 361/679.35 |
| 6,625,014 B1 * | 9/2003 | Tucker et al. | ............ | 361/679.34 |
| 6,882,528 B2 * | 4/2005 | Chuang | .................... | 361/679.35 |
| 7,054,153 B2 * | 5/2006 | Lewis et al. | .............. | 361/679.33 |
| 7,126,817 B2 * | 10/2006 | Li | ............................ | 361/679.37 |
| 7,130,187 B1 * | 10/2006 | Sun | .......................... | 361/679.34 |
| 7,137,767 B2 * | 11/2006 | Franke et al. | ................. | 411/401 |
| 7,382,610 B2 * | 6/2008 | Lin et al. | .................... | 361/679.33 |
| 7,518,858 B2 * | 4/2009 | Takahashi et al. | ........ | 361/679.33 |
| 7,616,436 B2 * | 11/2009 | DeMoss et al. | ........... | 361/679.34 |
| 7,889,491 B2 * | 2/2011 | Chiang et al. | ............ | 361/679.34 |
| 7,911,776 B2 * | 3/2011 | Ikeda et al. | .............. | 361/679.33 |
| 8,111,509 B2 * | 2/2012 | Lee | ........................ | 361/679.33 |
| 8,213,172 B2 * | 7/2012 | Sun | ......................... | 361/679.33 |
| 8,248,778 B2 * | 8/2012 | Dai | ........................ | 361/679.37 |
| 8,264,833 B2 * | 9/2012 | Fang et al. | ............... | 361/679.34 |
| 8,432,681 B2 * | 4/2013 | Tung-Ke | .................. | 361/679.36 |
| 8,562,036 B2 * | 10/2013 | Zhou | ............................. | 292/256 |
| 2004/0228073 A1 * | 11/2004 | Chuang | ........................ | 361/679 |
| 2005/0088815 A1 | 4/2005 | Chen et al. | | |
| 2005/0094366 A1 * | 5/2005 | Lewis et al. | .................. | 361/685 |
| 2006/0133030 A1 * | 6/2006 | Takahashi et al. | ............ | 361/685 |

(Continued)

FOREIGN PATENT DOCUMENTS

| | | |
|---|---|---|
| CN | 2533501 Y | 1/2003 |
| TW | M270387 | 7/2005 |

(Continued)

*Primary Examiner* — Jonathan Liu
*Assistant Examiner* — Stanton L Krycinski
(74) *Attorney, Agent, or Firm* — CKC & Partners Co., Ltd.

(57) ABSTRACT

A fastening module for fastening a data storage device is provided. A fastening trough is formed at a lower surface of the data storage device. The fastening module includes a frame bracket, a fastening member, and a buckling member. The frame bracket is used for carrying the data storage device. The frame bracket includes a lower frame and two side frames. The side frames are connected to two sides of the lower frame. The lower frame includes a clamping hole. The fastening member is disposed at the clamping hole and inserted into a fastening trough, so as to prevent the data storage device from moving. The buckling member is movably disposed at the side frames to buckle an upper surface of the data storage device.

10 Claims, 4 Drawing Sheets

(56) References Cited

U.S. PATENT DOCUMENTS

| | | | |
|---|---|---|---|
| 2006/0171110 A1* | 8/2006 | Li | 361/685 |
| 2006/0245156 A1* | 11/2006 | Sun | 361/685 |
| 2007/0014085 A1* | 1/2007 | Meserth et al. | 361/685 |
| 2008/0316698 A1* | 12/2008 | Yeh et al. | 361/685 |
| 2009/0073649 A1* | 3/2009 | Ikeda et al. | 361/679.35 |
| 2009/0168325 A1* | 7/2009 | Yeh et al. | 361/679.33 |
| 2010/0039766 A1* | 2/2010 | Chiang et al. | 361/679.34 |
| 2010/0170860 A1* | 7/2010 | Lee | 211/26 |
| 2011/0013355 A1* | 1/2011 | Chen | 361/679.33 |
| 2011/0085295 A1* | 4/2011 | Wu | 361/679.38 |
| 2011/0102998 A1* | 5/2011 | Lin et al. | 361/679.33 |
| 2011/0134598 A1* | 6/2011 | Hsiao | 361/679.33 |
| 2011/0188194 A1* | 8/2011 | Sun | 361/679.33 |
| 2011/0255235 A1* | 10/2011 | Chen | 361/679.33 |
| 2011/0255236 A1* | 10/2011 | Sun | 361/679.33 |
| 2012/0087084 A1* | 4/2012 | Nguyen et al. | 361/679.37 |

FOREIGN PATENT DOCUMENTS

| | | |
|---|---|---|
| TW | M275512 | 9/2005 |
| TW | M338422 | 8/2008 |
| TW | M343738 | 11/2008 |
| TW | M370022 | 12/2009 |
| TW | M397015 | 1/2011 |

* cited by examiner

FASTENING MODULE

RELATED APPLICATIONS

This application claims priority to Taiwan Application Serial Number 100117101, filed May 16, 2011, which is herein incorporated by reference.

BACKGROUND

1. Technology Field

The disclosure relates to a fastening module, and more particularly to a fastening module for fastening a data storage device.

2. Description of Related Art

Recently, there are various approaches for fastening a data storage device (e.g., a hard drive, a CD-ROM drive) in the computer industry. One of the most popular fastening approaches is to directly fasten the data storage device to a housing of a computer by screws. With the advance of computer technologies, fastening devices that are convenient to fasten the data storage device are developed.

A known fastening device is to use screws to fasten a data storage device to a positioning frame of a housing of a computer, and thus the data storage device is fastened to a positioning frame by screws merely after the data storage device has been engaged in the positioning frame and respective treaded holes at two sides of the data storage device have been aligned with respective openings at two sides of the positioning frame, thereby fixing the position of the data storage device. Furthermore, when the data storage device is required to be repaired or replaced, the screws fastened between the data storage device and the positioning frame have to be disassembled before the data storage device is disassembled from the front side of the positioning frame. That is, the screws are required not only to fasten the positioning frame to the housing, but also to fasten the data storage device to the positioning frame.

However, the foregoing fastening approach cannot improve the speed of assembling the data storage device, and wastes the time for assembling the computer, thus increasing the assembling cost of the computer. Furthermore, because there are various types of screws (e.g., I-shaped screws, X-shaped screws, star-shaped screws, etc.), maintenance staffs may need to prepare many types of screwdrivers for assembly or dismantle during the repairing of the data storage device in the computer.

SUMMARY

The disclosure provides an improved fastening module that is designed to improve the fastening approach between a data storage device and a frame bracket.

The fastening module disclosed in the embodiment of the invention performs functions of assembling and disassembling the data storage device relative to the frame bracket with assistances of a fastening member and a buckling member. After the fastening member is engaged with a clamping hole of the frame bracket and inserted into a fastening trough at a lower surface of the data storage device, the data storage device doesn't horizontally move relative to the frame bracket. Furthermore, the buckling member engaged with the frame bracket buckles an upper surface of the data storage device, so as to prevent the data storage device from vertically moving relative to the frame bracket.

According to an embodiment of the invention, a fastening module is used for fastening a data storage device. A fastening trough is formed at a lower surface of the data storage device. The fastening module includes a frame bracket, a fastening member, and a buckling member. The frame bracket is used for carrying the data storage device. The frame bracket includes a lower frame and two side frames. The side frames are connected to two sides of the lower frame. The lower frame has a clamping hole. The fastening member is disposed at the clamping hole and inserted into the fastening trough, so as to prevent the data storage device from moving. The buckling member is movably disposed at the side frames so as to buckle the upper surface of the data storage device.

In an embodiment of the invention, the clamping hole has a notch. The fastening member passes through the notch to be clamped in the clamping hole.

In an embodiment of the invention, the fastening member includes a resilient member and a pillar. The resilient member is clamped at the clamping hole. The pillar is inserted into the fastening trough.

In an embodiment of the invention, when the pillar is inserted into the fastening trough, a portion of the resilient member is cushioned between the data storage device and the lower frame.

In an embodiment of the invention, the resilient member includes a cushioning portion and an engaging portion. The engaging portion is connected to the cushioning portion. A diameter of the cushioning portion is greater than diameter of the clamping hole. The cushioning portion is clamped in the clamping hole when the engaging portion passes through the notch to enter the clamping hole.

In an embodiment of the invention, the resilient member further includes a disassembling portion. The engaging portion is connected to the cushioning portion and the disassembling portion. A diameter of the disassembling portion is larger than the diameter of the clamping hole.

In an embodiment of the invention, the resilient member is wheel hub-shaped.

In an embodiment of the invention, the side frames has a recess. The buckling member is accommodated in the recess and is capable of sliding toward or sliding away from the lower frame along a sidewall of the recess.

In an embodiment of the invention, the side frames include a plurality of protrusions located at the sidewall of the recess. The buckling member includes a block for being selectively engaged between any two adjacent protrusions.

In an embodiment of the invention, the buckling member includes a main body and a buckling portion. The buckling portion is connected to the top of the main body. The buckling member moves toward the lower frame along the sidewall of the recess to enable the buckling portion to buckle the upper surface.

In an embodiment of the invention, the buckling member is elastic.

In an embodiment of the invention, the buckling member is L-shaped.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
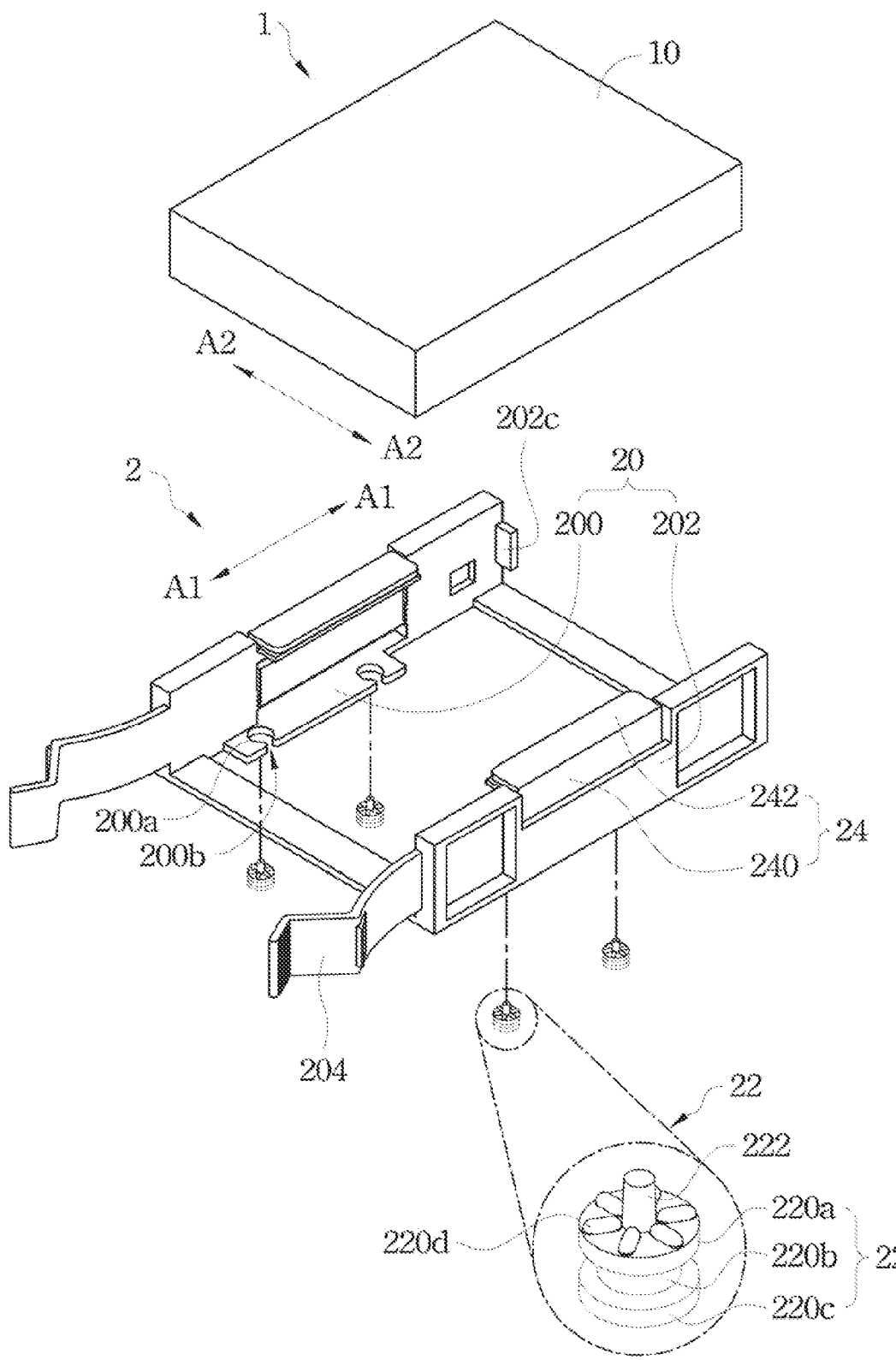
FIG. 1A is an exploded diagram of a fastening module according to an embodiment of the invention, in which a data storage device has not been carried on a lower frame.

Reference will now be made in detail to the present embodiments of the invention, examples of which are illustrated in the accompanying drawings. Wherever possible, the same reference numbers are used in the drawings and the description to refer to the same or like parts.

The embodiment of an improved fastening module is provided. Specifically, the fastening module is designed to improve the fastening approach between a data storage device and a frame bracket. The fastening module disclosed in the embodiment performs functions of assembling and disassembling the data storage device relative to the frame bracket with assistances of a fastening member and a buckling member. After the fastening member is engaged with a clamping hole of the frame bracket and inserted into a fastening trough at the lower surface of the data storage device, the data storage device doesn't horizontally move relative to the frame bracket. Furthermore, the buckling member engaged with the frame bracket buckles the upper surface of the data storage device, so as to prevent the data storage device from moving vertically relative to the frame bracket.

Figure 1B:
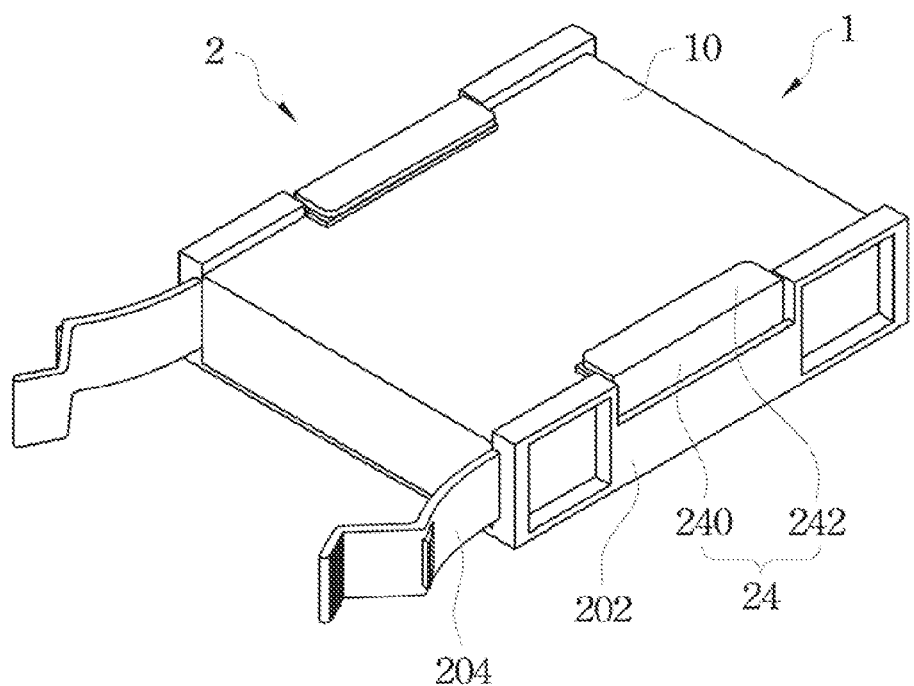
FIG. 1B is an assembly diagram of the fastening module in FIG. 1A, in which the data storage device has been fastened by the fastening module.

FIG. 1A is an exploded diagram of a fastening module 2 according to an embodiment of the invention, in which a data storage device 1 has not been carried on a lower frame 200. FIG. 1B is an assembly diagram of the fastening module 2 in FIG. 1A, in which the data storage device 1 has been fastened by the fastening module 2.

The fastening module 2 of the invention can be used to fasten the data storage device 1 (e.g., a floppy disk drive, a hard disk drive, a CD-ROM drive, etc.) in a housing of a computer, but the invention is not limited thereto. That is, the fastening module 2 of the embodiment is used to fasten any electronic product that is originally fastened by screws. As long as there is a requirement of briefly fastening the electronic product to different positions, the concepts of the invention is applied to replace the complicated fastening approach that fastens the electronic product by screws.

Figure 2:
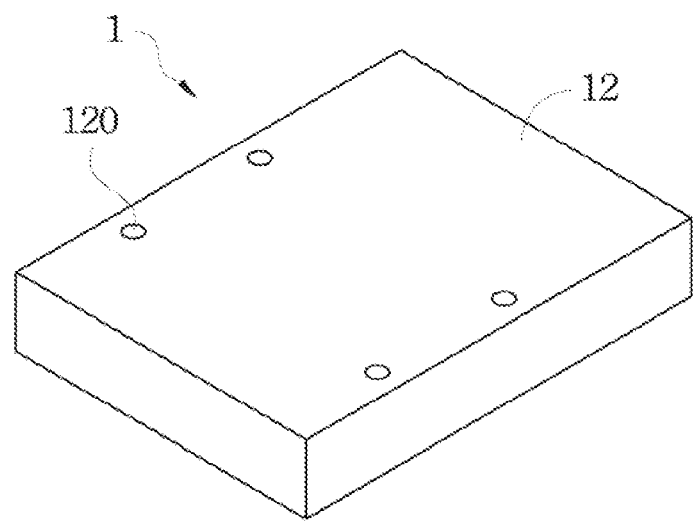
FIG. 2 is another perspective view of the data storage device in FIG. 1A.

FIG. 2 is another perspective view of the data storage device 1 in FIG. 1A.

As shown in FIG. 1A, FIG. 1B, and FIG. 2, the data storage device 1 includes an upper surface 10 and a lower surface 12, and fastening troughs 120 are formed at the lower surface 12 of the data storage device 1. The fastening module 2 includes a frame bracket 20, fastening members 22, and buckling members 24. The frame bracket 20 of the fastening module 2 includes a lower frame 200 and two side frames 202. The data storage device 1 is carried between the side frames 202 of the frame bracket 20 on the lower frame 200. The lower frame 200 of the frame bracket 20 has clamping holes 200a. The side frames 202 of the frame bracket 20 are connected to two sides of the lower frame 200. In the embodiment of the invention, the side frames 202 of the frame bracket 20 are parallel to a first direction A1. Therefore, when the data storage device 1 is carried on the lower frame 200 of the frame bracket 20, the data storage device 1 is clamped and limited between the side frames 202 so as to be guided by the side frames 202 to slide relative to the lower frame 200 along the first direction A1.

As shown in FIG. 1A and FIG. 2, if the position of the data storage device 1 relative to the lower frame 200 of the frame bracket 20 is adjusted properly, each of the clamping holes 200a of the lower frame 200 can be exactly aligned with the corresponding fastening trough 120 on the lower surface 12 of the data storage device 1 (i.e., each of the clamping holes 200a can communicate with the corresponding fastening trough 120). In order to conveniently and accurately align the clamping holes 200a of the lower frame 200 with the fastening troughs 120 of the data storage device 1, the side frames 202 of the frame bracket 20 can further include a retaining portion 202c. When the data storage device 1 is carried on the lower frame 200 of the frame bracket 20 and is guided by the side frames 202 to resist against the retaining portion 202c along the first direction A1, the distance between the retaining portion 202c and each of the fastening troughs 120 of the data storage device 1 is exactly equal to the distance between the retaining portion 202c and the corresponding clamping hole 200a of the lower frame 20. With an assistance of the retaining portion 202c of the side frames 202, the purpose of conveniently and accurately aligning the clamping holes 200a of the lower frame 200 with the fastening troughs 120 of the data storage device 1 can be achieved. In the embodiment of the invention, the retaining portion 202c of the side frames 202 is in a plate shape and is perpendicular to the first direction A1, but the invention is not limited thereto.

As shown in FIG. 1A and FIG. 2, each of the clamping holes 200a of the lower frame 200 has a notch 200b. Each of the fastening members 22 of the fastening module 2 may pass through the corresponding notch 200b to be clamped in the corresponding clamping hole 200a of the lower frame 200 and be inserted into the corresponding fastening trough 120 of the data storage device 1, so as to prevent the data storage device 1 from sliding relative to the lower frame 200. In other words, the fastening members 22 of the fastening module 2 are fastened to the lower frame 200 and the data storage device 1 so as to prevent the data storage device 1 from sliding along the first direction A1 relative to the lower frame 200.

In the embodiment of the invention, each of the notches 200b of the lower frame 200 substantially faces toward a second direction A2, and the second direction A2 is perpendicular to the first direction A1, but the invention is not limited thereto. Therefore, each of the fastening members 22 of the fastening module 2 can pass through the corresponding notch 200b along the second direction A2 to be clamped in the corresponding clamping hole 200a. Because the data storage device 1 is constrained by the side frames 202, the data storage device 1 does not generate a component force along the second direction A2 to make the fastening members 22 separated from the clamping to holes 200a and escape from the notches 200b during the sliding relative to the lower frame 200.

As shown in FIG. 1, each of the fastening members 22 of the fastening module 2 includes a resilient member 220 and a pillar 222. The resilient member 220 of each of the fastening members 22 can be clamped in the corresponding clamping hole 200a of the lower frame 200. After the resilient member 220 is clamped in the corresponding clamping hole 200a, the pillar 222 can be inserted into the corresponding fastening trough 120 of the data storage device 1, so as to prevent the data storage device 1 from sliding along the first direction A1 relative to the lower frame 200. When the data storage device 1 is carried on the lower frame 200 and the pillars 222 is inserted into the fastening troughs 120, a portion of each of the resilient members 220 is cushioned between the data storage device 1 and the lower frame 200, so as to decrease undesired vibrations transmitted between the data storage device 1 and the lower frame 200.

In the embodiment of the invention, in order to conveniently engage each of the fastening members 22 with the corresponding clamping hole 200a via the corresponding notch 200b of the lower frame 200, the resilient member 220 of each of the fastening member 22 may include a cushioning portion 220a, an engaging portion 220b, and a disassembling portion 220c. The engaging portion 220b is connected to the cushioning portion 220a and the disassembling portion 220c. The cushioning portion 220a can be cushioned between the data storage device 1 and the lower frame 200 when the data storage device 1 is carried on the lower frame 200. In the embodiment of the invention, the cushioning portion 220a may further include a plurality of ribs 220d, and the ribs 220d radially surround a periphery of the corresponding pillar 222. The engaging portion 220b may pass through the corresponding notch 200b along the second direction A2 to be clamped in the corresponding clamping hole 200a, so as to clamp the a portion of the lower frame 200 between the cushioning portion 220a and the disassembling portion 220c. After each of the resilient members 220 is clamped in the corresponding clamping hole 200a, the disassembling portion 220c protrudes from the bottom of the lower frame 200. Therefore, any of the fastening members 22 can be disassembled from the lower frame 200 by directly applying a force parallel to the second direction A2 onto the disassembling portion 220c of the resilient member 220, so as to make the engaging portion 220b of the resilient member 220 separated from the clamping hole 200a of the lower frame 200 and escape from the notch 200b. In the embodiment of the invention, the resilient member 220 of each of the fastening member 22 is wheel hub-shaped (such as a wheel hub of a car), but the invention is not limited thereto.

In the embodiment of the invention, in order to engage the engaging portion 220b of each of the resilient members 220 with the corresponding clamping hole 200a of the lower frame 200, a diameter of the engaging portion 220b may be designed to be greater than a diameter of the corresponding clamping hole 200a. Therefore, when the engaging portion 220b of each of the resilient members 220 is engaged with the corresponding clamping hole 200a of the lower frame 200, the engaging portion 220b is deformed due to an interference fit formed between the engaging portion 220b and the clamping hole 200a. Furthermore, in order to clamp the lower frame 200 between each of the cushioning portions 220a and the corresponding disassembling portion 220c when the engaging portion 220b of each of the resilient members 220 is clamped in the corresponding clamping hole 200a of the lower frame 200, a diameter of each of the cushioning portions 220a and the diameter of each of the disassembling portions 220c has to be greater than a diameter of the corresponding clamping hole 200a. Therefore, when the engaging portion 220b of each of the resilient members 220 is clamped in the corresponding clamping hole 200a of the lower frame 200, the engaging portion 220b will not be separated from the clamping hole 200a along a direction perpendicular to the lower frame 200.

In an embodiment of the invention, the buckling members 24 that are engaged with the side frames 202 of the frame bracket 20 can be outwardly deformed before the data storage device 1 is assembled with the frame bracket 20 along the direction perpendicular to the lower frame 200, and the buckling members 24 can be released and recovered after the data storage device 1 is carried on the lower frame 200 of the frame bracket 20. Meanwhile, the recovered buckling members 24 buckle the upper surface 10 of the data storage device 1 to prevent the data storage device 1 from escaping from the lower frame 200 of the frame bracket 20, but the invention is not limited thereto. That is, in the embodiment, the buckling members 24 are elastic and can be made of elastic materials.

Figure 3A:
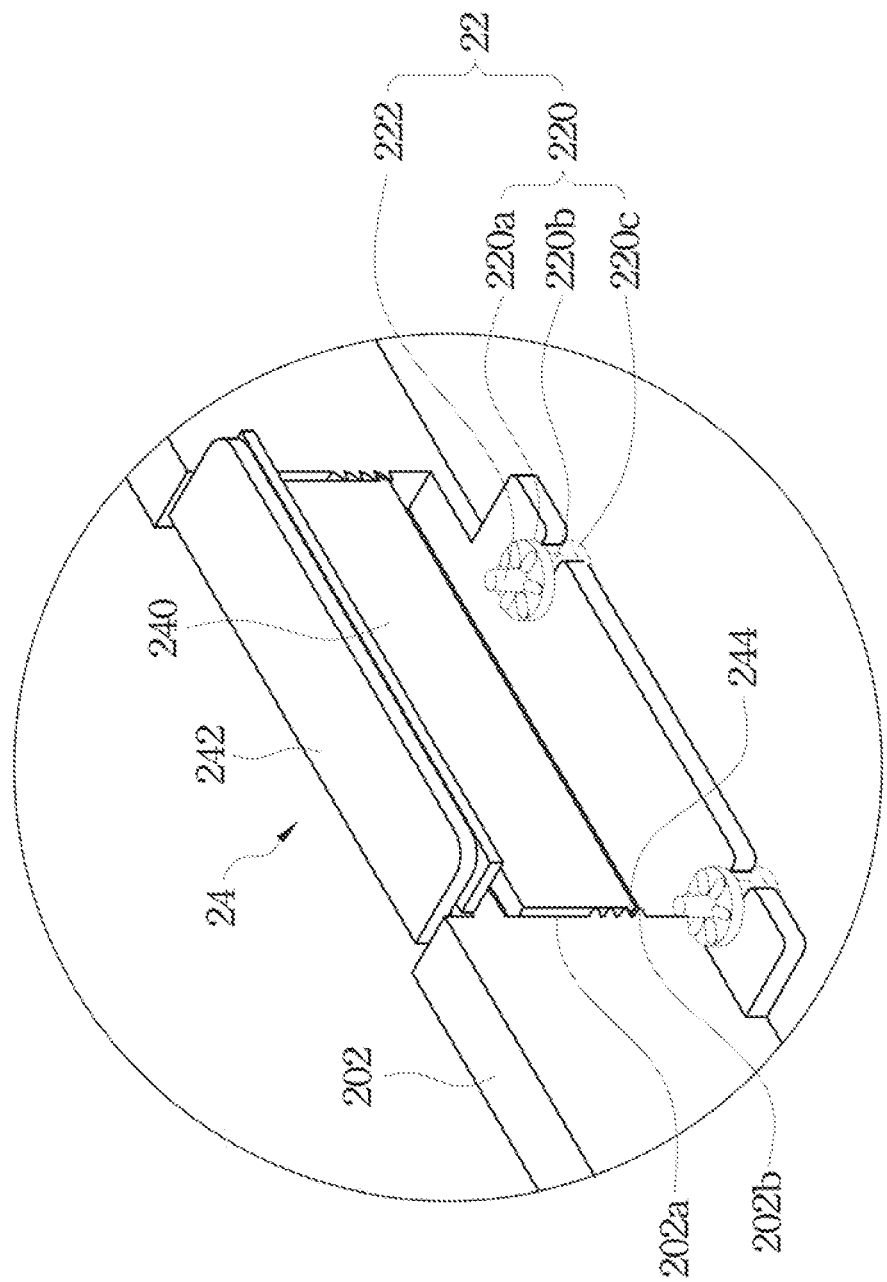
FIG. 3A is a partial schematic diagram of a frame bracket in FIG. 1A, in which a buckling member is entirely accommodated in a recess of the frame bracket.
Figure 3B:
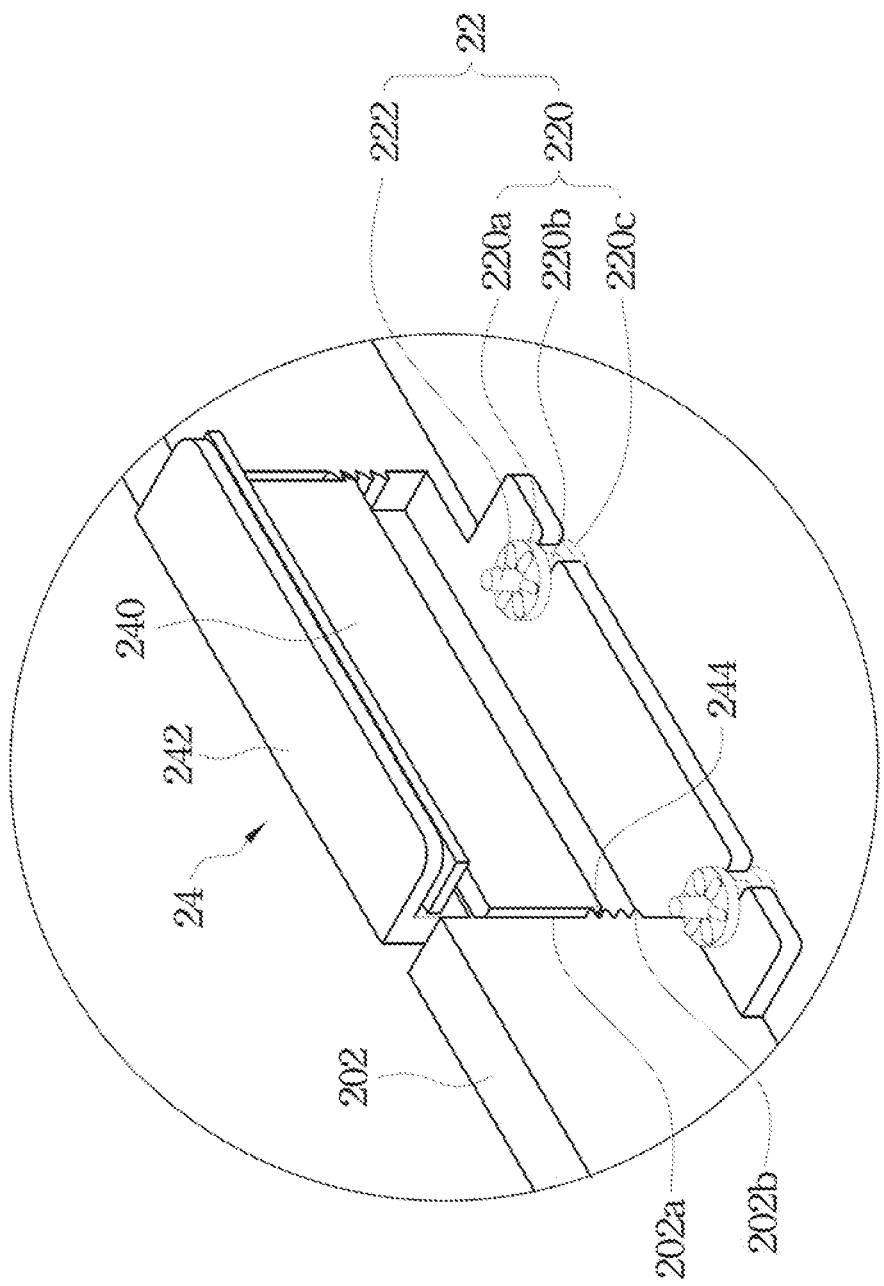
FIG. 3B is another schematic diagram of the frame bracket in FIG. 3A, in which the buckling member moves away from a lower frame along a sidewall of the recess.

FIG. 3A is a partial schematic diagram of a frame bracket 20 in FIG. 1A, in which the buckling member 24 is entirely accommodated in a recess 202a of the frame bracket 20. FIG. 3B is another schematic diagram of the frame bracket 20 in FIG. 3A, in which the buckling member 24 moves away from lower frame 200 along a sidewall of the recess 202a.

As shown in FIG. 3A and FIG. 3B, the side frame 202 has the recess 202a. The buckling member 24 is accommodated in the recess 202a of the side frame 202 and is capable of sliding toward or sliding away from the lower frame 200 along the sidewall of the recess 202a (i.e., moves along a direction perpendicular to the lower frame 200). The buckling member 24 includes a main body 240 and a buckling portion 242. The buckling portion 242 of the buckling member 24 is connected to the top of the main body 240. The buckling member 24 can move toward the lower frame 200 along the sidewall of the recess 202a to enable the buckling portion 242 to buckle the upper surface 10 of the data storage device 1. In an embodiment of the invention, the buckling member is L-shaped, but the invention is not limited thereto.

Under the foregoing configurations, the purpose of assembling the data storage device 1 to the fastening module 2 can be achieved without deforming the buckling members 24 in advance. In other words, in order to assemble the data storage device 1 to the fastening module 2, the buckling member 24 can be moved away from the lower frame 200 along the inner wall of the recess 202a of the side frame 202 before the data storage device 1 is disposed between the buckling portion 242 of the buckling member 24 and the lower frame 200 of the frame bracket 20. Afterwards, the buckling member 24 can be moved toward the lower frame 200 along the inner wall of the recess 202a of the side frame 202, so as to clamp the data storage device 1 between the buckling portion 242 of the buckling member 24 and the lower frame 200 (i.e., the upper surface 10 and the lower surface 12 of the data storage device 1 are respectively clamped by the buckling portion 242 of the buckling member 24 to and the lower frame 200).

As shown in FIG. 3A and FIG. 3B, in order to fasten other data storage devices 1 with different heights, the side frame 202 of the frame bracket 20 includes a plurality of protrusions 202b located at the sidewall of the recess 202a. The protrusions are jagged-shaped, but the invention is not limited thereto. The buckling member 24 of the fastening module 2 includes a block 244, and the block 244 is connected to the bottom of the main body 240. The block 244 of the buckling member 24 is used for being selectively engaged between any adjacent two of the protrusions 202b, so as to adjust the distance between the buckling member 24 and the lower frame 200 when the buckling member 24 moves toward or moves away from the lower frame 200 along the sidewall of the recess 202a.

Accordingly, the fastening module 2 can prevent the data storage device 1 from moving along the direction parallel to the lower frame 200 by engaging the fastening members 22 with the clamping holes 200a when the data storage device 1 is carried on the lower frame 200 of the frame bracket 20, and can prevent the data storage device from moving along the direction perpendicular to the lower frame 200 by using the buckling portion 242 of the buckling member 24, thereby achieving the purpose of stably fastening the data storage device 1.

In the embodiment of the invention, the quantity of the fastening troughs 120 of the data storage device 1, the quantity of the clamping holes 200*a* of the frame bracket 20, and the quantity of the fastening members 22 are all four, so as to obtain better stability of fastening, but the invention is not limited thereto and can be adjusted as required.

Moreover, in order to assemble the fastening module 2 of the invention to a housing of a computer system (not shown) conveniently, each of the side frames 202 of the fastening module 2 may include a latch 204, as shown in FIG. 1A. Therefore, the data storage device 1 fastened to the fastening module 2 can be easily fastened to the housing of the computer system by using the latch 204.

According to the foregoing recitations of the embodiments of the invention, it can be seen that the fastening module of the invention is designed to improve the fastening approach between a data storage device and a frame bracket. The fastening module disclosed in the embodiment performs functions of assembling and disassembling the data storage device relative to the frame bracket with assistances of a fastening member and a buckling member. After the fastening member is engaged with a clamping hole of the frame bracket and inserted into a fastening trough at the lower surface of the data storage device, the data storage device doesn't horizontally move relative to the frame bracket. Furthermore, the buckling member engaged with the frame bracket buckles the upper surface of the data storage device, thereby preventing the data storage device from moving vertically relative to the frame bracket.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fastening module for fastening a data storage device of which a lower surface has a fastening trough formed thereon, the fastening module comprising:
    a frame bracket for carrying the data storage device, the frame bracket comprising a lower frame and two side frames, wherein the side frames are connected to two sides of the lower frame, one of said side frames has a recess, the side frame comprises a plurality of protrusions located at a sidewall of the recess, the protrusions are jagged-shaped, and the lower frame comprises a clamping hole;
    a fastening member disposed at the clamping hole and inserted into the fastening trough, so as to prevent the data storage device from moving; and
    a buckling member movably disposed at the side frame so as to buckle the upper surface of the data storage device, wherein the buckling member is accommodated in the recess and is capable of sliding toward or sliding away from the lower frame along the sidewall of the recess, and the buckling member comprises a block for being selectively engaged between any two adjacent protrusions on the sidewall.

2. The fastening module of claim 1, wherein the clamping hole has a notch for allowing the fastening member to pass through and be clamped in the clamping hole.

3. The fastening module of claim 2, wherein the fastening member comprises a resilient member and a pillar, the resilient member is clamped in the clamping hole, and the pillar is inserted into the fastening trough.

4. The fastening module of claim 3, wherein when the pillar is inserted into the fastening trough, a portion of the resilient member is cushioned between the data storage device and the lower frame.

5. The fastening module of claim 3, wherein the resilient member comprises a cushioning portion and an engaging portion connected to the cushioning portion, and a diameter of the cushioning portion is greater than a diameter of the clamping hole, such that the cushioning portion is clamped in the clamping hole when the engaging portion passes through the notch to enter the clamping hole.

6. The fastening module of claim 5, wherein the resilient member further comprises a disassembling portion, and the engaging portion is connected to the cushioning portion and the disassembling portion, and a diameter of the disassembling portion is larger than the diameter of the clamping hole.

7. The fastening module of claim 3, wherein the resilient member is wheel hub-shaped.

8. The fastening module of claim 1, wherein the buckling member comprises a main body and a buckling portion, and the buckling portion is connected to the top of the main body, and the buckling member moves toward the lower frame along the sidewall of the recess to enable the buckling portion to buckle the upper surface.

9. The fastening module of claim 1, wherein the buckling member is elastic.

10. The fastening module of claim 1, wherein the buckling member is L-shaped.

* * * * *